Patented Dec. 30, 1924.

1,521,295

UNITED STATES PATENT OFFICE.

HOMER D. HOLLER, OF LEONIA, NEW JERSEY, ASSIGNOR TO DIAMOND ELECTRIC SPECIALTIES CORPORATION, OF NEWARK, NEW JERSEY, A CORPORATION OF NEW JERSEY.

DRY CELL.

No Drawing.     Application filed May 12, 1921.   Serial No. 469,000.

*To all whom it may concern:*

Be it known that I, HOMER D. HOLLER, a citizen of the United States, and a resident of Leonia, in the county of Essex, State of New Jersey, have invented an Improvement in Dry Cells, of which the following is a specification.

My present invention relates to primary batteries, particularly of the type generally known under the name of "dry" batteries. It is an object of the present invention to improve the capacity and efficiency of such batteries, and to simplify and to render more economical and convenient the manufacture of the same.

By way of example I shall, in the accompanying specification, describe illustrative embodiments of the "dry" batteries of my invention and of the methods that may be used for fabricating the same. It is, however, to be clearly understood that my invention is not limited to the embodiments thereof which are herein described for purposes of example merely.

In connection with the aforesaid illustrative embodiments of my invention, it may be desirable briefly to point out the types of "dry" batteries hitherto in use and on which the "dry" batteries of my invention are an improvement. In the usual method of constructing small dry cells of the "bag" type, such as are used in flashlights, it is customary to compress or mold a mixture of manganese dioxide, consisting generally of pyrolusite or artificially prepared manganese dioxide, with carbonaceous material, such as coke carbon or graphite, generally in the granulated or powder form, around a carbon rod which serves as the positive electrode of the finished cell. This mixture, usually referred to as the "mix," is moistened with an aqueous solution of zinc chloride and ammonium chloride before compression. This solution serves as the electrolyte. The compressed "mix," after the molding operation is completed, is in most cases wrapped with cheese-cloth or other bibulous material, which serves to protect the molded carbon electrode and "mix" from injury during subsequent handling and also to retain the particles of carbon and of manganese dioxide which might otherwise come into contact with the negative electrode and zinc, and cause injury to the cell.

After wrapping the positive electrode, prepared, for example, as above, it is generally inserted into a zinc container which serves as the negative electrode. The inner surface of the bottom of the zinc container is generally covered with a paraffin paper disc or other insulating material which serves to separate the positive electrode from the zinc or negative electrode.

After the insertion of the wrapped positive electrode into the zinc container, the annular space between the positive electrode is filled with an electrolytic paste. This paste generally consists of an aqueous solution of zinc chloride and ammonium chloride thickened with flour, starch or equivalent material, to prevent the solution from flowing when the position of the cell is changed. The conditions of making this paste are so chosen that it will "set" shortly after pouring to form a jelly-like mass. After the paste has set, a paper collar is usually placed over the exposed end of the carbon electrode which is generally provided with a brass cap, and sealing wax is then poured upon the collar, whereupon the cell is considered complete.

The principal inconveniences and defects of this mode of procedure arise from the fact that the capacity of such cells is comparatively small and that the pouring of the paste before setting is inconvenient and uneconomical since it heretofore has required the use either of a low temperature to keep the paste from setting until after it is poured, when it then sets at normal temperatures, or of heating or "cooking" to cause the paste to set if it is poured at normal temperatures. These methods of pouring the paste and causing the same to set require the use of refrigerating apparatus in the one case and of heating apparatus in the other case, and are thus undesirable and wasteful.

I have discovered that if the ammonium chloride used in the "mix" and serving as part of the electrolyte is replaced in whole or in part by a bromide, particularly and preferably ammonium bromide, a substantial increase in the output of the cell results. This increase amounts in many cases to as high as 10% of the capacity of the cell over what such capacity would be if ammonium chloride alone were used. The increase in output varies with varying proportions of ammonium bromide.

I have made a further discovery in the preparation of the paste that if the ammonium chloride generally used is substituted in whole or in part by ammonium bromide, the paste may be poured at normal temperatures and permitted to set at the same temperatures. Accordingly, neither the cooling or refrigerating nor the "cooking" or heating hitherto needed in the pouring and in the setting of the paste is required to obtain a satisfactory jelly-like paste for "dry" cells. For example, if 25 c. c. of a saturated solution of ammonium chloride and 12 grams of a starchy material, such as wheat flour, are stirred together to form a smooth paste, and then 25 c. c. of a saturated solution of ammonium bromide are added and the whole is stirred to form a smooth, uniform paste, a paste is obtained which may readily be poured at ordinary room temperatures and which, after pouring, sets to a jelly-like mass in several minutes.

I find that such a paste has all the desirable characteristics required for such material, and is of the proper consistency, although it has been subjected neither to refrigeration or cooling, nor to any heating or "cooking" operation. The time required for such a paste to set at ordinary room temperatures is generally several minutes, but the time for setting is reduced if the usual top layer of hot sealing wax is applied soon after pouring the paste and before the same has set, since in such a case the rise in temperature resulting from the heat of the hot sealing wax hastens the setting.

It is of course to be understood that the proportions of chloride, such as ammonium chloride, and of bromide, such as ammonium bromide, may be varied within comparatively wide limits, with the understanding that where more bromide is used the paste sets more rapidly. Such proportions of bromide and chloride should therefore be chosen as to bring about setting of the paste after sufficient time has elapsed to permit the paste to be poured in the ordinary course of manufacture of the cell.

It is also to be understood that my invention is not limited to the particular embodiments thereof which are herein set forth for purposes of illustration only.

What I claim is:

1. A self-setting paste for "dry" batteries containing ammonium bromide.

2. A self-setting paste for "dry" batteries containing ammonium chloride and ammonium bromide.

3. A paste for "dry" batteries containing a starchy material mixed with ammonium bromide.

4. A self-setting paste for "dry" batteries containing flour mixed with ammonium bromide.

5. A paste for "dry" batteries containing wheat flour mixed with a chloride and ammonium bromide.

6. A self-setting paste for "dry" batteries containing a starchy material mixed with ammonium chloride and ammonium bromide.

7. A depolarizing "mix" for "dry" batteries containing a zinc chloride and ammonium bromide.

8. An electrolyte for "dry" batteries containing ammonium bromide.

9. An electrolyte for "dry" batteries containing ammonium chloride and ammonium bromide.

10. The method of preparing a paste for "dry" batteries which comprises adding to a starchy material sufficient bromide to permit pouring and to cause setting substantially at normal temperatures.

11. The method of preparing a paste for "dry" batteries which comprises adding to wheat flour sufficient ammonium bromide to permit pouring and to cause setting substantially at normal temperatures.

12. The method of preparing a paste for "dry" batteries which comprises adding to wheat flour containing ammonium chloride sufficient ammonium bromide to permit pouring and to cause setting substantially at normal temperatures.

In testimony whereof, I have signed my name to this specification this sixth day of May, 1921.

HOMER D. HOLLER.